US012679986B2

(12) United States Patent
Ozawa

(10) Patent No.: US 12,679,986 B2
(45) Date of Patent: Jul. 14, 2026

(54) INKJET INK AND INKJET RECORDING DEVICE

(71) Applicant: KYOCERA DOCUMENT SOLUTIONS INC., Osaka (JP)

(72) Inventor: Noriaki Ozawa, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 167 days.

(21) Appl. No.: 18/845,958

(22) PCT Filed: Mar. 8, 2023

(86) PCT No.: PCT/JP2023/008732
§ 371 (c)(1),
(2) Date: Sep. 11, 2024

(87) PCT Pub. No.: WO2023/176612
PCT Pub. Date: Sep. 21, 2023

(65) Prior Publication Data

US 2025/0188299 A1 Jun. 12, 2025

(30) Foreign Application Priority Data

Mar. 15, 2022 (JP) ................................ 2022-040243

(51) Int. Cl.
*C09D 11/32* (2014.01)
*C09B 48/00* (2006.01)
(Continued)

(52) U.S. Cl.
CPC ............ *C09D 11/322* (2013.01); *C09B 48/00* (2013.01); *C09B 67/0036* (2013.01); *C09B 67/0063* (2013.01)

(58) Field of Classification Search
CPC . C09B 48/00; C09B 67/0036; C09B 67/0063; B41J 2/01; C09D 11/322; C09D 11/326; C09D 11/38
See application file for complete search history.

(56) References Cited

U.S. PATENT DOCUMENTS

2011/0043566 A1 2/2011 Saito
2011/0057982 A1 3/2011 Saito
(Continued)

FOREIGN PATENT DOCUMENTS

JP 2000273383 A 10/2000
JP 201142771 A 3/2011
(Continued)

OTHER PUBLICATIONS

WIPO, International Search Report issued on May 11, 2023.

*Primary Examiner* — Sharon Polk
(74) *Attorney, Agent, or Firm* — Li & Cai Intellectual Property (USA) Office

(57) ABSTRACT

An inkjet ink includes a quinacridone pigment, a pigment dispersion resin, and a water-soluble organic solvent. The pigment dispersion resin includes an adsorbed resin adsorbed on the quinacridone pigment and an unadsorbed resin that is not adsorbed on the quinacridone pigment. A ratio of the unadsorbed resin to the pigment dispersion resin is 40 mass % or less. The water-soluble organic solvent includes a predetermined water-soluble organic solvent having an octanol/water partition coefficient Log P of 0.00 or more. A content ratio of the predetermined water-soluble organic solvent with respect to a mass of the inkjet ink is 15 mass % or more and 40 mass % or less. A sulfur concentration in a supernatant liquid obtained by centrifuging the inkjet ink at 1,050,000 G for 3 hours is 0.5 ppm or more and 2.0 ppm or less.

6 Claims, 2 Drawing Sheets

(51) Int. Cl.

| | |
|---|---|
| ***C09B 67/20*** | (2006.01) |
| ***C09B 67/22*** | (2006.01) |
| ***C09D 11/322*** | (2014.01) |

(56) References Cited

U.S. PATENT DOCUMENTS

| | | | | |
|---|---|---|---|---|
| 2017/0342286 | A1 | 11/2017 | Yanagawa et al. | |
| 2024/0166903 | A1* | 5/2024 | Yoshii | C09D 11/38 |
| 2024/0191090 | A1* | 6/2024 | Sato | C09D 11/106 |

FOREIGN PATENT DOCUMENTS

| | | | | | |
|---|---|---|---|---|---|
| JP | 201152174 | A | | 3/2011 | |
| JP | 2016180048 | A | * | 10/2016 | |
| JP | 201839969 | A | | 3/2018 | |
| JP | 2022007126 | A | * | 1/2022 | B41J 2/2146 |

* cited by examiner

INKJET INK AND INKJET RECORDING DEVICE

FIELD OF THE DISCLOSURE

The present invention relates to an inkjet ink and an inkjet recording device.

BACKGROUND OF THE DISCLOSURE

In an inkjet ink, a quinacridone pigment is dispersed in an aqueous medium. The use of a quinacridone pigment derivative as a pigment dispersant for dispersing the quinacridone pigment in the aqueous medium has been considered. For example, the inkjet recording liquid described in Patent Literature 1 includes an aqueous pigment dispersion. This aqueous pigment dispersion includes an aqueous liquid, a quinacridone pigment dispersed in the aqueous liquid, a water-soluble quinacridone derivative adsorbed on the surface of the quinacridone pigment, and an unadsorbed water-soluble quinacridone derivative.

CITATION LIST

Patent Literature

Patent Literature 1: Japanese Patent Application Laid-open No. 2000-273383.

SUMMARY OF THE DISCLOSURE

However, the inkjet recording liquid described in Patent Literature 1 leaves room for improvement in terms of the dispersibility of the quinacridone pigment. Further, the inkjet recording liquid described in Patent Literature 1 is insufficient in terms of suppressing misdirection of the ink from a recording head included in an inkjet recording device.

the present invention has been made in view of the above-mentioned problems, and the object thereof is to provide an inkjet ink that has excellent dispersibility of the quinacridone pigment and is capable of suppressing misdirection of the ink from the recording head and an inkjet recording device using this inkjet ink.

Solution to Problem

An inkjet ink according to the present invention is an inkjet ink, which includes a quinacridone pigment, a pigment dispersion resin, and a water-soluble organic solvent. The pigment dispersion resin includes an adsorbed resin adsorbed on the quinacridone pigment and an unadsorbed resin that is not adsorbed on the quinacridone pigment. A ratio of the unadsorbed resin to the pigment dispersion resin is 40 mass % or less. The water-soluble organic solvent includes a predetermined water-soluble organic solvent having an octanol/water partition coefficient Log P of 0.00 or more. A content ratio of the predetermined water-soluble organic solvent with respect to a mass of the inkjet ink is 15 mass % or more and 40 mass % or less. A sulfur concentration in a supernatant liquid obtained by centrifuging the inkjet ink at 1,050,000 G for 3 hours is 0.5 ppm or more and 2.0 ppm or less.

An inkjet recording device according to the present invention includes: a conveying unit that conveys a recording medium; and a line head. The line head ejects the above-mentioned inkjet ink to the recording medium.

Advantageous Effects of Invention

An inkjet ink according to the present invention has excellent dispersibility of the quinacridone pigment and is capable of suppressing misdirection of the ink from the recording head. An inkjet recording device according to the present invention is capable of ejecting the ink having excellent dispersibility of the quinacridone pigment and suppressing misdirection of the ink from the recording head.

DETAILED DESCRIPTION OF THE EXEMPLARY EMBODIMENTS

Figure 1:
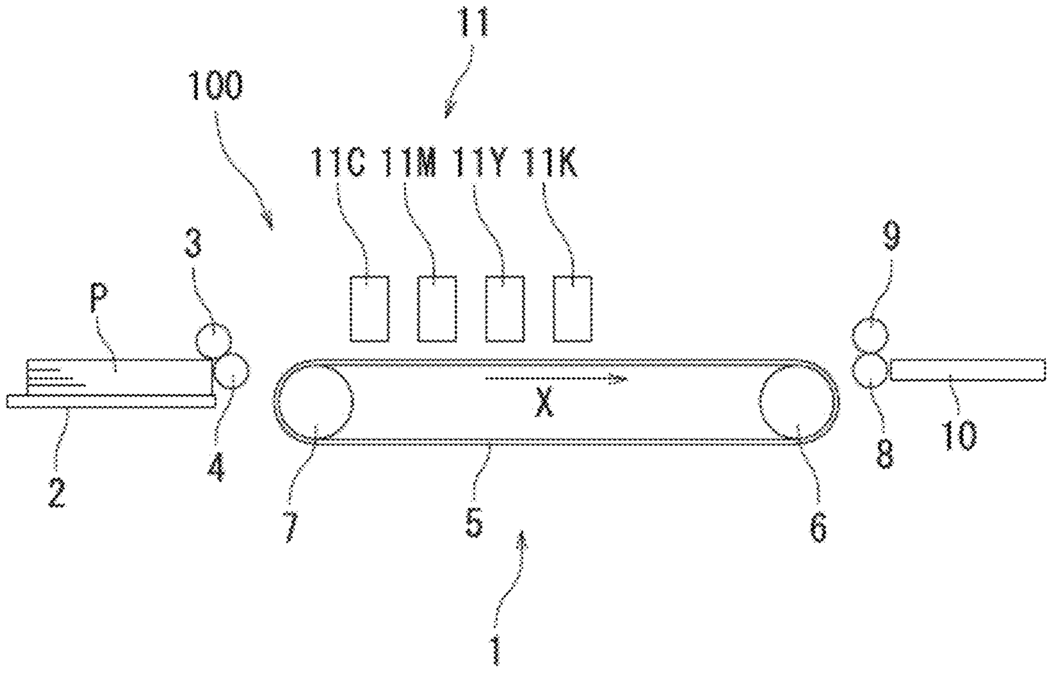
FIG. 1 is a side view showing an example of an inkjet recording device according to a second embodiment of the present invention.

Embodiments of the present invention will be described below. First, terms used in the present specification will be described. Unless otherwise specified, the volume median diameter ($D_{50}$) is a value measured using a dynamic light scattering particle size distribution analyzer ("Zetasizer Nano ZS" manufactured by Malvern Panalytical Ltd.). Unless otherwise specified, the acid value is a value measured in accordance with "Japanese Industrial Standard (JIS) K0070:1992". Unless otherwise specified, the mass average molecular weight (Mw) is a value measured using gel permeation chromatography. In the present specification, acrylic and methacrylic are collectively referred to as "(meth)acrylic" in some cases. The components described in the present specification may each be used alone, or two or more of them may be used in combination.

First Embodiment: Ink

An inkjet ink according to a first embodiment of the present invention (hereinafter, referred to simply as an ink in some cases) will be described below.

The ink according to the first embodiment includes a quinacridone pigment; a pigment dispersion resin; and a water-soluble organic solvent. The pigment dispersion resin includes an adsorbed resin adsorbed on the quinacridone pigment and an unadsorbed resin that is not adsorbed on the quinacridone pigment. A ratio of the unadsorbed resin to the pigment dispersion resin is 40 mass % or less. The water-soluble organic solvent includes a predetermined water-soluble organic solvent having an octanol/water partition coefficient Log P of 0.00 or more. A content ratio of the predetermined water-soluble organic solvent with respect to a mass of the ink is 15 mass % or more and 40 mass % or less. A sulfur concentration in a supernatant liquid obtained by centrifuging the ink at 1,050,000 G for 3 hours is 0.5 ppm or more and 2.0 ppm or less.

Hereinafter, the "ratio of the unadsorbed resin to the pigment dispersion resin" will be referred to as an "unadsorbed resin ratio" in some cases. Further, the "octanol/water partition coefficient Log P" is referred to simply as "Log P" in some cases. Further, the "sulfur concentration in the supernatant liquid obtained by centrifuging the ink at 1,050, 000 G for 3 hours" is referred to as a "predetermined sulfur concentration" in some cases.

By having the above-mentioned configuration, the ink according to the first embodiment has excellent dispersibility of the quinacridone pigment and is capable of suppressing misdirection of the ink from the recording head. The reasons for this are presumed to be as follows.

Since the quinacridone pigment is difficult to disperse in the aqueous medium, a sulfur compound (e.g., a derivative of the quinacridone pigment having a sulfur atom) is often added to the quinacridone pigment as a dispersant. Hereinafter, the "derivative of the quinacridone pigment having a sulfur atom" will be referred to as a "sulfur-containing pigment derivative" in some cases. For example, when the sulfur compound is adsorbed on the quinacridone pigment, the quinacridone pigment is dispersed in the aqueous medium. Here, in the ink according to the first embodiment, the predetermined sulfur concentration is 0.5 ppm or more. The ink having the predetermined sulfur concentration of 0.5 ppm or more includes, for example, a sufficient amount of the sulfur compound that is a dispersant, and thus, the quinacridone pigment is suitably dispersed in the aqueous medium.

Here, part of the sulfur compound is free in the aqueous medium without being adsorbed on the quinacridone pigment. The polarity of the sulfur compound is relatively high. For this reason, the free sulfur compound is electrostatically adhered to the nozzle surface of the recording head and the inner wall of the nozzle hole in some cases. The adhered sulfur compound causes misdirection of the ink from the recording head. In this regard, in the ink according to the first embodiment, the predetermined sulfur concentration is set to 2.0 ppm or less. The ink having the predetermined sulfur concentration of 2.0 ppm or less is capable of suppressing misdirection of the ink from the recording head, because the amount of the free sulfur compound is relatively small.

Further, in order to disperse the quinacridone pigment in the aqueous medium, the ink includes a pigment dispersion resin. The pigment dispersion resin includes an adsorbed resin adsorbed on the quinacridone pigment and an unadsorbed resin that is not adsorbed on the quinacridone pigment. The unadsorbed resin is electrostatically adhered to the nozzle surface of the recording head and the inner wall of the nozzle hole in some cases. The adhered unadsorbed resin also causes misdirection of the ink from the recording head similarly to the sulfur compound. In this regard, in the ink according to the first embodiment, the unadsorbed resin ratio is set to 40 mass % or less. The ink having the unadsorbed resin ratio of 40 mass % or less is capable of suppressing misdirection of the ink from the recording head, because the amount of the unadsorbed resin is relatively small.

As described above, the ink according to the first embodiment includes a predetermined water-soluble organic solvent. The predetermined water-soluble organic solvent having Log P of 0.00 or more has a relatively high hydrophobicity and thus easily wets on the nozzle surface of the recording head and the inner wall of the nozzle hole. For this reason, even if the sulfur compound and the pigment dispersion resin are adhered to the nozzle surface of the recording head and the inner wall of the nozzle hole, the sulfur compound and the pigment dispersion resin are easily removed by swelling with the predetermined water-soluble organic solvent. Further, the content ratio of the predetermined water-soluble organic solvent with respect to the mass of the ink according to the first embodiment is 15 mass % or more, and a sufficient amount of the predetermined water-soluble organic solvent is included in the ink. For this reason, the sulfur compound and the pigment dispersion resin adhered to the nozzle surface or the like can be removed by sufficiently swelling. As a result, it is possible to suppress misdirection of the ink from the recording head. Further, the content ratio of the predetermined water-soluble organic solvent with respect to the mass of the ink according to the first embodiment is 40 mass % or less, and an excessively large amount of the predetermined water-soluble organic solvent having a high hydrophobicity is not included. For this reason, the hydrophobicity of the aqueous medium including the predetermined water-soluble organic solvent is not excessively high, and aggregation of pigment particles can be suppressed. As a result, the quinacridone pigment is suitably dispersed in the aqueous medium.

The reason why the ink according to the first embodiment has excellent dispersibility of the quinacridone pigment and is capable of suppressing misdirection of the ink from the recording head has been described above. The ink according to the first embodiment will be described below in more detail. Note that the components described below may be used alone or two or more of them may be used in combination.

<Pigment Composition>

The ink includes, for example, a pigment composition. The pigment composition includes a quinacridone pigment and, as necessary, a sulfur compound (e.g., a sulfur-containing pigment derivative). The quinacridone pigment and the sulfur-containing pigment derivative will be described below.

(Quinacridone Pigment)

Examples of the quinacridone pigment include C.I. Pigment Violet (19 and 42), C.I. Pigment Red (122, 202, 206, 207, and 209), and C.I. Pigment Orange (48 and 49).

The content ratio of the quinacridone pigment in the ink is favorably 1 mass % or more and 12 mass % or less, more favorably 4 mass % or more and 8 mass % or less. By setting the content ratio of the quinacridone pigment to 1 mass % or more, it is possible to make the image density of the image formed by the ink suitable. Further, by setting the content ratio of the quinacridone pigment to 12 mass % or less, it is possible to make the fluidity of the ink suitable. The ink may include only the quinacridone pigment as a pigment. Further, in order to adjust the hue of the ink, the ink may further include, as a pigment, a pigment other than the quinacridone pigment, in addition to the quinacridone pigment.

(Sulfur-Containing Pigment Derivative)

For example, when the sulfur-containing pigment derivative is adsorbed on the quinacridone pigment, the quinacridone pigment is dispersed in the aqueous medium. The sulfur-containing pigment derivative has, for example, a sulfur-containing group. Examples of the sulfur-containing group include a sulfo group, a sulfino group, a sulfeno group, a thiocarboxy group, a dithiocarboxy group, and a sulfide group. The sulfur-containing pigment derivative is, for example, a compound obtained by substituting the quinacridone pigment exemplified above with a sulfur-containing group.

The sulfur-containing pigment derivative is favorably a metal salt. When the sulfur-containing pigment derivative is a metal salt, the affinity of the sulfur-containing pigment derivative to the aqueous medium increases and the quinacridone pigment on which the sulfur-containing pigment derivative is adsorbed is suitably dispersed in the aqueous medium. As the sulfur-containing pigment derivative that is a metal salt, the sulfur compound represented by the formula (1) (hereinafter, referred to as a sulfur-containing pigment derivative (1) in some cases) is favorable. That is, the ink favorably includes the sulfur-containing pigment derivative (1).

(Chem. 1)

(1)

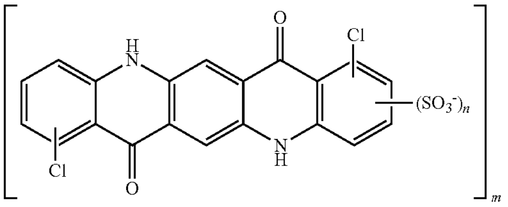

In the formula (1), n represents an integer of 1 or more and 3 or less, m represents an integer of 1 or more and 3 or less, and X represents a metal ion.

In the formula (1), n favorably represents 2 or 3. m favorably represents 1. X in the formula (1) favorably represents a mono- to tri-metal ion, more favorably a divalent or trivalent metal ion, and still more favorably $Al^{3+}$ or $Mg^{2+}$.

Examples of the sulfur-containing pigment derivative (1) include sulfur compounds represented by formulae (1-1) and (1-2) (hereinafter, respectively referred to as sulfur-containing pigment derivatives (1-1) and (1-2) in some cases). Note that m in the formulae (1-1) and (1-2) represents 1, which is omitted.

(Chem. 2)

(1-1)

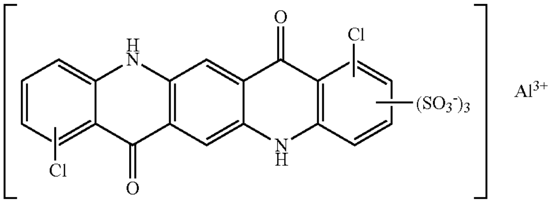

(1-2)

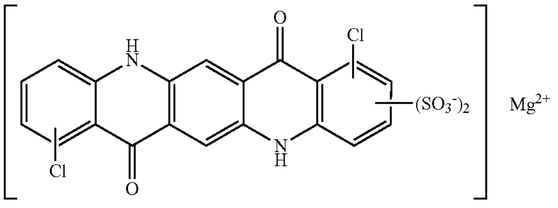

The content ratio of the sulfur-containing pigment derivative with respect to the total mass of the quinacridone pigment and the sulfur-containing pigment derivative is favorably 3 mass % or more and 5 mass % or less, more favorably 4 mass % or more and 5 mass % or less. Hereinafter, the "content ratio of the sulfur-containing pigment derivative with respect to the total mass of the quinacridone pigment and the sulfur-containing pigment derivative" will be referred to as a "derivative content ratio" in some cases. When the derivative content ratio is 3 mass % or more, it is possible to suitably disperse the quinacridone pigment in the aqueous medium. Meanwhile, when the derivative content ratio is 5 mass % or less, it is possible to easily adjust the predetermined sulfur concentration to the value of 2.0 ppm or less and further suppress misdirection of the ink from the recording head. The lower the derivative content ratio, the lower the predetermined sulfur concentration tends to be.

The content ratio of the sulfur-containing pigment derivative in the ink is favorably 0.03 mass % or more and 0.60 mass % or less, more favorably 0.12 mass % or more and 0.40 mass % or less.

<Pigment Dispersion Resin>

The pigment dispersion resin includes an adsorbed resin and an unadsorbed resin. The adsorbed resin is adsorbed on the quinacridone pigment. The quinacridone pigment constitutes pigment particles together with, for example, the adsorbed resin. The pigment particle includes, for example, a core including a quinacridone pigment and an adsorbed resin covering the core. Since the pigment dispersion resin is hydrophilic, the adsorbed resin adsorbed on the surface of the quinacridone pigment allows the quinacridone pigment to be dispersed in the aqueous medium. Meanwhile, the unadsorbed resin is not adsorbed on the quinacridone pigment. The unadsorbed resin is free in the aqueous medium.

As described above, the unadsorbed resin ratio is 40 mass % or less. The lower limit of the unadsorbed resin ratio is not particularly limited, but is favorably 5 mass % or more, more favorably 15 mass % or more, and still more favorably 20 mass % or more. The unadsorbed resin ratio can be measured by centrifuging the ink using a centrifuge. The unadsorbed resin ratio can be calculated on the basis of the formula "unadsorbed resin ratio=100×mass of unadsorbed resin/total mass of pigment dispersion resin=100×mass of unadsorbed resin/(mass of unadsorbed resin+mass of adsorbed resin)". For example, the higher the ejection rate of a wet disperser in the process of preparing a pigment dispersion liquid described below, the higher the unadsorbed resin ratio tends to be.

Examples of the pigment dispersion resin include a (meth)acrylic resin, a styrene-(meth)acrylic resin, a styrene-maleic acid resin, and a urethane resin. From the viewpoint of stably dispersing the quinacridone pigment, a styrene-(meth)acrylic resin is favorable as a pigment dispersion resin.

The styrene-(meth)acrylic resin includes, as repeating units, at least a repeating unit derived from styrene or a derivative thereof and a repeating unit derived from (meth)acrylic acid. The styrene-(meth)acrylic resin favorably further includes, as a repeating unit, a repeating unit derived from (meth)acrylic acid ester.

Examples of a first monomer capable of forming the repeating unit derived from styrene or a derivative thereof include styrene, α-methylstyrene, and vinyltoluene. As the first monomer, styrene is favorable. The content ratio of the repeating unit derived from styrene or a derivative thereof, of all repeating units included in the pigment dispersion resin, is favorably 27 mass % or more and 60 mass % or less, more favorably 25 mass % or more and 35 mass % or less.

Examples of a second monomer capable of forming the repeating unit derived from (meth)acrylic acid include acrylic acid and methacrylic acid. As the second monomer, methacrylic acid is favorable. The content ratio of the repeating unit derived from (meth)acrylic acid, of all repeating units included in the pigment dispersion resin, is favorably 4.5 mass % or more and 10.0 mass % or less.

Examples of a third monomer capable of forming the repeating unit derived from (meth)acrylic acid ester include (meth)acrylic acid alkylester. As (meth)acrylic acid alkylester, (meth)acrylic acid alkylester having 1 or more and 8 or less carbon atoms in an alkyl group is favorable, (meth) acrylic acid alkylester having 1 or more and 4 or less carbon atoms in an alkyl group is more favorable, methyl (meth) acrylate and butyl (meth)acrylate are still more favorable, and methyl methacrylate and butyl acrylate is particularly favorable. The content ratio of the repeating unit derived from (meth)acrylic acid ester, of all repeating units included in the pigment dispersion resin, is favorably 35 mass % or more and 70 mass % or less, more favorably 50 mass % or more and 70 mass % or less. In the case where the pigment dispersion resin includes two or more types of repeating units derived from (meth)acrylic acid ester, the content ratio of the repeating unit derived from (meth)acrylic acid ester is the total content ratio of the two or more types of repeating units derived from (meth)acrylic acid ester.

As the pigment dispersion resin, a resin including a repeating unit derived from (meth)acrylic acid, a repeating unit derived from (meth)acrylic acid alkylester, and a repeating unit derived from styrene is favorable. As the pigment dispersion resin, a resin including a repeating unit derived from (meth)acrylic acid, a repeating unit derived from methyl (meth)acrylate, a repeating unit derived from butyl (meth)acrylate, and a repeating unit derived from styrene is more favorable. As the pigment dispersion resin, a resin including a repeating unit derived from methacrylic acid, a repeating unit derived from methyl methacrylate, a repeating unit derived from butyl acrylate, and a repeating unit derived from styrene is still more favorable. The pigment dispersion resin may include, as repeating units, only these repeating units, or may further include a repeating unit other than these repeating units.

The acid value of the pigment dispersion resin is favorably 50 mgKOH/g or more and 300 mgKOH/g or less, more favorably 50 mgKOH/g or more and 150 mgKOH/g or less, and still more favorably 90 mgKOH/g or more and 110 mgKOH/g or less. When the acid value of the pigment dispersion resin is 50 mgKOH/g or more, the $D_{50}$ of the pigment particles dispersed in the aqueous medium is made suitable. When the acid value of the pigment dispersion resin is 300 mgKOH/g or less, the preservation stability of the ink is made suitable.

The mass average molecular weight of the pigment dispersion resin is favorably 10000 or more and 50000 or less, more favorably 15000 or more and 30000 or less. When the mass average molecular weight of the pigment dispersion resin is 10000 or more and 50000 or less, the viscosity of the ink is made suitable.

The content ratio of the pigment dispersion resin in the ink is favorably 0.5 mass % or more and 8.0 mass % or less, more favorably 1.5 mass % or more and 4.0 mass % or less. By setting the content ratio of the pigment dispersion resin to 0.5 mass % or more, it is possible to suitably suppress aggregation of the quinacridone pigment. By setting the content ratio of the pigment dispersion resin to 8.0 mass % or less, it is possible to suitably suppress clogging of the nozzle of the recording head.

<Aqueous Medium>

The ink includes an aqueous medium. The aqueous medium is a medium including water. The aqueous medium may function as a solvent or a dispersion medium. Specific examples of the aqueous medium include an aqueous medium that includes water and a water-soluble organic solvent.

(Predetermined Water-Soluble Organic Solvent)

The water-soluble organic solvent includes a predetermined water-soluble organic solvent. The Log P of the predetermined water-soluble organic solvent is 0.00 or more. The Log P of the water-soluble organic solvent (e.g., a predetermined water-soluble organic solvent and a different water-soluble organic solvent described below) can be measured by a flask shaking method described in "JIS (Japanese Industrial Standard) Z7260-107:2000".

The upper limit of the Log P of the predetermined water-soluble organic solvent is not particularly limited, but is favorably 0.66 or less, more favorably 0.51 or less, and still more favorably 0.30 or less. When the Log P of the predetermined water-soluble organic solvent is 0.66 or less, the hydrophobicity of the aqueous medium including the predetermined water-soluble organic solvent becomes moderately low and the quinacridone pigment is more suitably dispersed in the aqueous medium.

Examples of the predetermined water-soluble organic solvent include 1,2-octanediol, 3-methyl-1,5-pentanediol, triethylene glycol monobutylether, 1,2-pentanediol, and diethylene glycol monobutylether. The literature values of the Log P of these predetermined water-soluble organic solvents are shown in the following Table 1.

TABLE 1

| Predetermined water-soluble organic solvent | LogP |
|---|---|
| 1,2-octanediol | 0.66 |
| Diethylene glycol monobutylether | 0.30 |
| 3-methyl-1,5-pentanediol | 0.07 |
| Triethylene glycol monobutylether | 0.02 |
| 1,2-pentanediol | 0.00 |

The predetermined water-soluble organic solvent is favorably at least one selected from the group consisting of 3-methyl-1,5-pentanediol, triethylene glycol monobutylether, 1,2-pentanediol, and diethylene glycol monobutylether. The predetermined water-soluble organic solvent is more favorably 3-methyl-1,5-pentanediol, triethylene glycol monobutylether, 1,2-pentanediol, or diethylene glycol monobutylether.

As described above, the content ratio of the predetermined water-soluble organic solvent with respect to the mass of the ink is 15 mass % or more and 40 mass % or less. The content ratio of the predetermined water-soluble organic solvent with respect to the mass of the ink is favorably 15 mass % or more and 35 mass % or less. In the case where the ink includes two or more types of predetermined water-soluble organic solvents, the content ratio of the predetermined water-soluble organic solvent corresponds to the total content ratio of the two or more types of predetermined water-soluble organic solvents.

The content ratio of the predetermined water-soluble organic solvent with respect to the mass of the ink can be calculated by, for example, measuring the ink using a gas chromatograph mass spectrometer (GC-MS) and quantifying the water-soluble organic solvent included in the ink on the basis of a calibration curve method.

Further, the content ratio of the predetermined water-soluble organic solvent with respect to the mass of the water-soluble organic solvent (total mass of the predetermined water-soluble organic solvent and the different water-soluble organic solvent) is favorably 75.0 mass % or more and 89.0 mass % or less, more favorably 75.0 mass % or more and 87.5 mass % or less.

(Different Water-Soluble Organic Solvent)

The water-soluble organic solvent may include, as necessary, a water-soluble organic solvent (hereinafter, referred to as a different water-soluble organic solvent in some cases)

other than the predetermined water-soluble organic solvent. The Log P of the different water-soluble organic solvent is less than 0.00.

Examples of the different water-soluble organic solvent include 1,6-hexanediol, ethyldiglycol, 1,5-pentanediol, diethylene glycol monoethylether, 2-pyrrolidone, 1,3-propanediol, propylene glycol, glycerin, and triethylene glycol. The literature values of the Log P of these different water-soluble organic solvents are shown in the following Table 2.

TABLE 2

| Different water-soluble organic solvent | LogP |
|---|---|
| 1.6-hexanediol | −0.11 |
| Ethyldiglycol | −0.15 |
| 1,5-pentanediol | −0.49 |
| Diethylene glycol monoethylether | −0.54 |
| 2-pyrrolidone | −0.85 |
| 1,3-propanediol | −1.09 |
| Propylene glycol | −1.40 |
| Glycerin | −1.76 |
| Triethylene glycol | −1.98 |

The different water-soluble organic solvent is favorably glycerin. The content ratio of the different water-soluble organic solvent in the ink is favorably 1 mass % or more and 10 mass % or less.

(Water)

From the viewpoint of making the viscosity of the ink suitable, the content ratio of water in the ink is favorably 20 mass % or more and 80 mass % or less, more favorably 0 mass % or more and 80 mass % or less.

<Surfactant>

The ink favorably further includes a surfactant. The surfactant makes the compatibility and dispersion stability of each component included in the ink. Further, the surfactant makes the permeability of the ink to the recording medium suitable. As the surfactant, a nonionic surfactant is favorable.

Examples of the nonionic surfactant include acetylenediol and an ethylene oxide adduct of acetylenediol. Examples of acetylenediol include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. As the nonionic surfactant, an ethylene oxide adduct of acetylenediol is favorable. The HLB value of the nonionic surfactant is favorably 4 or more and 14 or less, more favorably 4 or more and 8 or less or 10 or more and 14 or less. In the case where the ink includes a surfactant, the content ratio of the surfactant in the ink is favorably 0.01 mass % or more and 1.0 mass % or less.

<Other Components>

The ink according to the first embodiment may further include, as necessary, known additives (more specifically, a dissolution stabilizer, an anti-drying agent, an antioxidant, a viscosity adjustor, a pH adjuster, an antifungal agent, and the like).

<Method of Producing Ink>

A method of producing the ink according to the first embodiment includes, for example, a process of preparing a pigment composition, a process of preparing a pigment dispersion liquid, and a mixing process.

(Process of Preparing Pigment Composition)

In the process of preparing a pigment composition, a pigment composition that includes a quinacridone pigment and a sulfur-containing pigment derivative is prepared. The process of preparing a pigment composition includes, for example, a solvent treatment process (hereinafter, referred to as a process A in some cases) and a post-treatment process (hereinafter, referred to as a process B in some cases). The sulfur-containing pigment derivative is added in the process B. As necessary, the sulfur-containing pigment derivative may be added in the process A in addition to the process B.

(Process of Preparing Pigment Composition: Process A)

In the process A, the quinacridone pigment is treated with a solvent. Examples of the method of treating the quinacridone pigment include a method of kneading a quinacridone pigment and a solvent using a kneader (e.g., a salt milling kneader). In the process A, crystal growth of the quinacridone pigment and micronization of the quinacridone pigment are promoted. By promoting the micronization of the quinacridone pigment, the colorability and saturation of the quinacridone pigment are made suitable. The temperature and time for treating the quinacridone pigment are not particularly limited, and only need to be set appropriately to achieve a desired particle diameter and granularity distribution of the quinacridone pigment. In the process A, the sulfur-containing pigment derivative may be added as necessary. Further, in the process A, an inorganic base (more specifically, sodium hydroxide, potassium hydroxide, or the like) may be added as a grinding aid as necessary. A kneaded product of the quinacridone pigment obtained in the process A is washed with water or a solvent as necessary to obtain, for example, a wet cake shape.

(Process of Preparing Pigment Composition: Process B)

In the process B, the kneaded product of the quinacridone pigment obtained in the process A is post-treated. Examples of the post-treatment method include a method of removing the solvent from the kneaded product of the quinacridone pigment to separate the pigment composition. Examples of the method of separating the pigment composition include filtration, drying, and distillation of a solvent using a rotary evaporator. In the case where the solvent is distilled off, the temperature for distilling off the solvent is, for example, a temperature of the boiling point of the solvent or more. The separated pigment composition may be pulverized, as necessary.

In the process B, the sulfur-containing pigment derivative is added. In the process B, the aggregation of the quinacridone pigment is suppressed, and both the dispersibility and preservation stability of the quinacridone pigment can be achieved. The sulfur-containing pigment derivative may be added at the start of the process of separating the pigment composition from the kneaded product or during the separation process. The mass of the sulfur-containing pigment derivative added in the process B (in the case where the sulfur-containing pigment derivative is added in the process A in addition to the process B, the total mass of the sulfur-containing pigment derivative added in the process A and the process B) to 100 parts by mass of the quinacridone pigment is favorably 0.5 parts by mass or more and 15 parts by mass or less, more favorably 1 part by mass or more and 10 parts by mass or less, still more favorably 3 parts by mass or more and 6 parts by mass or less, and still more favorably 3 parts by mass or more and 5 parts by mass or less. When the mass of the sulfur-containing pigment derivative is 0.5 parts by mass or more and 15 parts by mass or less to 100 parts by mass of the quinacridone pigment, the hue of the quinacridone pigment is made suitable. When the mass of the sulfur-containing pigment derivative is 3 parts by mass or more and 6 parts by mass or less to 100 parts by mass of the quinacridone pigment, the predetermined sulfur concentration can be easily adjusted to a value within a desired range.

In the case where the sulfur-containing pigment derivative is added in the process A in addition to the process B, the type of sulfur-containing pigment derivative added in the process B may be the same as or different from the type of sulfur-containing pigment derivative added in the process A. Further, in the case where the sulfur-containing pigment derivative is added in the process A in addition to the process B, the mass of the sulfur-containing pigment derivative added in the process B is favorably equal to or greater than the mass of the sulfur-containing pigment derivative added in the process A, from the viewpoint of making the colorability of the quinacridone pigment suitable.

(Process of Preparing Pigment Dispersion Liquid)

In the process of preparing a pigment dispersion liquid, a pigment composition including a quinacridone pigment, a pigment dispersion resin, and an aqueous medium are mixed to obtain a pigment dispersion liquid. In order to sufficiently dispersing the pigment particles, the pigment dispersion liquid may further include a surfactant. In the pigment dispersion liquid, $D_{50}$ of the pigment particle including a quinacridone pigment and a pigment dispersion resin is favorably 50 nm or more and less than 140 nm.

The content ratio of the quinacridone pigment in the pigment dispersion liquid is favorably 5 mass % or more and 25 mass % or less, more favorably 10 mass % or more and 20 mass % or less. The content ratio of the pigment dispersion resin in the pigment dispersion liquid is favorably 2 mass % or more and 10 mass % or less, more favorably 4 mass % or more and 8 mass % or less. In the case where the pigment dispersion liquid includes a surfactant, the content ratio of the surfactant in the pigment dispersion liquid is favorably 0.1 mass % or more and 2 mass % or less, more favorably 0.3 mass % or more and 1 mass % or less.

The pigment dispersion liquid can be prepared by wet dispersing the components included in the above-mentioned pigment dispersion liquid using a media-type wet disperser. Examples of the media-type wet disperser include a bead mill (more specifically, "nano grain mill" manufactured by ASADA IRON WORKS. CO., LTD., "MSC mill" manufactured by NIPPON COKE & ENGINEERING. CO., LTD., and "DYNO (registered trademark) mill" manufactured by Willy A Bachofen AG).

In the wet dispersing using a media-type wet disperser, for example, small beads (e.g., beads having a diameter of 0.5 mm or more and 1.0 mm or less) can be used as media. By changing the diameter of the beads, for example, the degree of dispersion and unadsorbed resin ratio of the pigment can be changed. The smaller the diameter of the beads, the smaller $D_{50}$ of the pigment particles tends to be. The smaller the diameter of the beads, the easier it becomes for the core including the quinacridone pigment to be covered with the pigment dispersion resin and the lower the unadsorbed resin ratio tends to be. The material of the beads is not particularly limited, but a hard material (e.g., glass and zirconia) is favorable. In the wet dispersing, the ejection rate of the media-type wet disperser is, for example, 200 g/min or more and 600 g/min or less. The higher the ejection rate of the media-type wet disperser, the higher the unadsorbed resin ratio tends to be.

(Mixing Process)

In the mixing process, a pigment dispersion liquid including a quinacridone pigment and a pigment dispersion resin, an aqueous medium including a water-soluble organic solvent, and a component (e.g., a surfactant) to be blended as necessary are mixed using a stirrer. After mixing the components of the ink, the foreign substance and coarse particles may be removed using a filter (e.g., a filter having a pore size of 5 μm or less).

The ratio of the pigment dispersion liquid in all raw materials of the ink is, for example, 25 mass % or more and 60 mass % or less. Note that the ink according to the first embodiment can be suitably used, for example, in an inkjet recording device, more specifically, an inkjet recording device including a line head described below.

Second Embodiment: Inkjet Recording Device

Next, an inkjet recording device according to a second embodiment of the present invention will be described. The inkjet recording device according to the second embodiment includes a conveying unit that conveys a recording medium and a line head. The line head ejects the above-mentioned ink according to the first embodiment to the recording medium. Details of the inkjet recording device according to the second embodiment will be described below with reference to the drawings. Note that the drawings to be referred to schematically show mainly respective components for ease of understanding, and the size, number, and the like of each illustrated component are different from actual ones in some cases.

Figure 2:
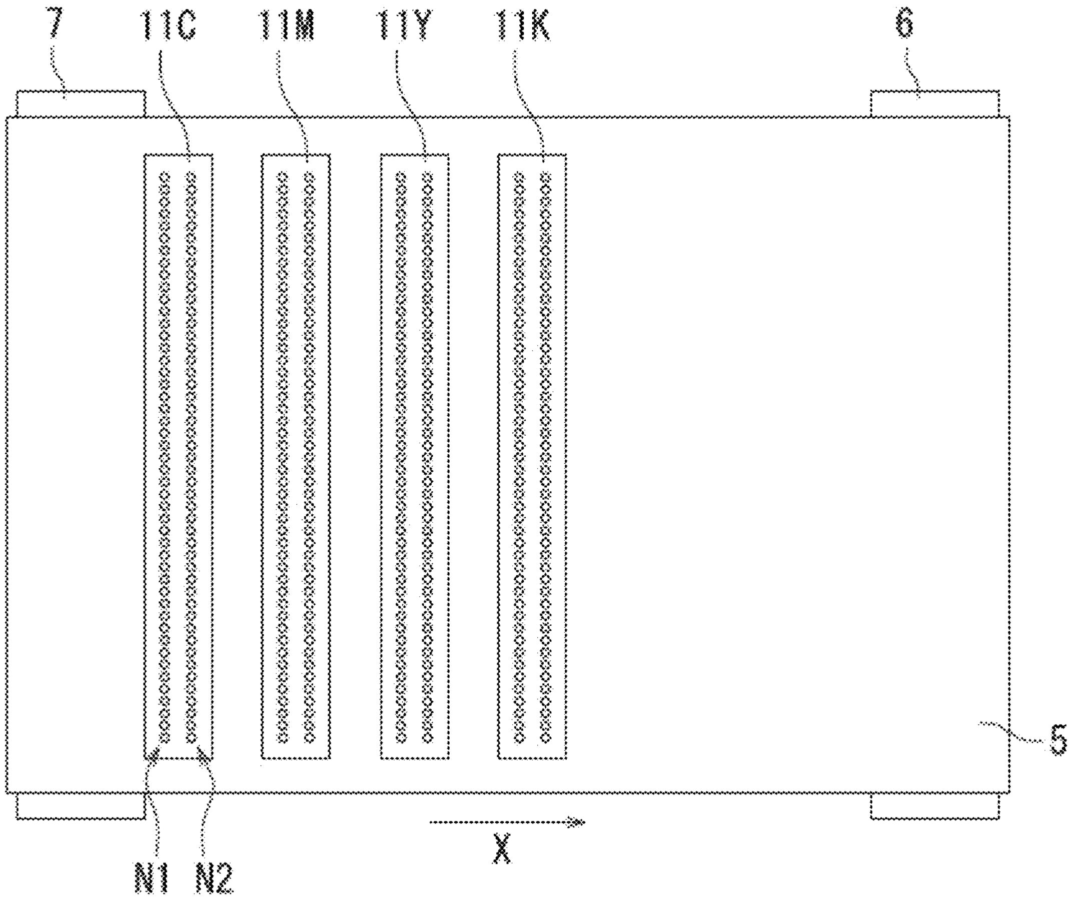
FIG. 2 is a diagram of a conveyor belt of the inkjet recording device shown in FIG. 1 when viewed from above.

FIG. 1 is a side view showing a configuration of an inkjet recording device 100 that is an example of the inkjet recording device according to the second embodiment. FIG. 2 is a diagram of a conveyor belt 5 of the inkjet recording device 100 shown in FIG. 1 when viewed from above.

As shown in FIG. 1, the inkjet recording device 100 mainly includes a conveying unit 1 and a plurality of line heads 11. The inkjet recording device 100 further includes a paper feed tray 2, a paper feed roller 3, a paper feed driven roller 4, an output roller 8, an output driven roller 9, and a paper output tray 10, in addition to the conveying unit 1 and the plurality of line heads 11.

In the inkjet recording device 100, the paper feed tray 2, the paper feed roller 3 and the paper feed driven roller 4, the conveying unit 1, the output roller 8 and the output driven roller 9, and the paper output tray 10 are disposed in this order from the upstream side to the downstream side in a conveying direction X of recording paper P corresponding to the recording medium (hereinafter, referred to simply as a conveying direction X in some cases).

Pieces of recording paper P are stacked and housed in the paper feed tray 2. The paper feed roller 3 and the paper feed driven roller 4 are disposed at positions adjacent to the paper feed tray 2. The paper feed roller 3 and the paper feed driven roller 4 are pressed against each other at positions facing each other. The paper feed roller 3 is driven to rotate in the counterclockwise direction in FIG. 1. The paper feed driven roller 4 rotates in accordance with rotation of the paper feed roller 3. As a result, the paper feed roller 3 and the paper feed driven roller 4 supply the pieces of recording paper P stacked and housed in the paper feed tray 2 to the conveying unit 1 one sheet at a time from the top.

The conveying unit 1 includes a belt drive roller 6 disposed on the downstream side in the conveying direction X, a belt driven roller 7 disposed on the upstream side in the conveying direction X, and the conveyor belt 5 that is an endless belt stretched over the belt drive roller 6 and the belt driven roller 7. The belt drive roller 6 is driven to rotate in the clockwise direction in FIG. 1. As a result, the belt drive roller 6 drives the conveyor belt 5 in a driven manner. As a result, the conveyor belt 5 conveys the recording paper P corresponding to the recording medium in the conveying direction X. The belt driven roller 7 rotates in accordance with the belt drive roller 6 via the conveyor belt 5.

The plurality of line heads 11 is disposed above the conveyor belt 5. The plurality of line heads 11 includes a first line head 11C, a second line head 11M, a third line head 11Y, and a fourth line head 11K. The first line head 11C to the fourth line head 11K are arranged in the conveying direction X in this order. Each of the first line head 11C to the fourth line head 11K is arranged at the same height. The first line head 11C to the fourth line head 11K are respectively filled with inks of four different colors (cyan, magenta, yellow, and black). The ink to be deposited in the second line head 11M is the ink according to the first embodiment, which is magenta. The first line head 11C to the fourth line head 11K eject the respective inks from each of a plurality of nozzles described below to the recording paper P corresponding to the recording medium. As a result, an image (e.g., a color image) is formed on the recording paper P conveyed by the conveyor belt 5.

The output roller 8 and the output driven roller 9 are pressed against each other at positions facing each other. The output roller 8 is driven to rotate in the clockwise direction in FIG. 1. The output driven roller 9 rotates in accordance with rotation of the output roller 8. As a result, the output roller 8 and the output driven roller 9 output the recording paper P conveyed from the conveying unit 1 to the paper output tray 10. The output recording paper P is placed on the paper output tray 10.

As shown in FIG. 2, each of the first line head 11C to the fourth line head 11K includes a first nozzle column N1 and a second nozzle column N2 arranged in the conveying direction X. Each of the first nozzle column N1 and the second nozzle column N2 includes a plurality of nozzles arranged in a direction (hereinafter, referred to as a width direction in some cases) orthogonal to the conveying direction X. The width of each of the first nozzle column N1 and the second nozzle column N2 (i.e., the width of the region that can be recorded by the first line head 11C to the fourth line head 11K) is equal to or larger than the width of the recording paper P. For this reason, each of the first line head 11C to the fourth line head 11K is capable of recording an image on the recording paper P conveyed on the conveyor belt 5 while being fixed. That is, the inkjet recording device 100 employs a single-pass system that is a system in which shuttle movement is not performed.

The inkjet recording device 100 that is an example of the inkjet recording device according to the second embodiment has been described above with reference to the drawings. However, the inkjet recording device according to the second embodiment is not limited to the inkjet recording device 100. For example, the number of line heads included in the inkjet recording device according to the second embodiment may be 1 or more and 3 or less, or 5 or more. Further, the inkjet recording device according to the second embodiment may be a multifunction device. Further, the inkjet recording device according to the second embodiment may employ a multi-pass system. Further, in the first line head 11C to the fourth line head 11K in FIG. 2, the number of nozzles, the interval between the nozzles, and the positional relationship between the nozzles can be appropriately set in accordance with the specifications of the apparatus.

The inkjet recording device according to the second embodiment includes a line head, and thus is capable of printing at high speed as compared with an inkjet recording device including a serial head. Further, the inkjet recording device according to the second embodiment uses the ink according to the first embodiment, and thus is capable of ejecting an ink having excellent dispersibility of the quinacridone pigment and suppressing misdirection of the ink from the recording head.

EXAMPLES

Examples of the present invention will be described below. However, the present invention is not limited to the following Examples. Note that in the following Examples, ion exchanged water will be referred to simply as water.

[Study 1: Predetermined Sulfur Concentration]

First, the predetermined sulfur concentration was studied. Inks (I-1) to (I-5) to be studied were prepared by the following method.

<Preparation of Ink (I-1)>

(Preparation of Pigment Composition)

A wet cake of a quinacridone pigment (C.I. Pigment Red 122) with a solid content of 95 parts by mass and 5 parts by mass of methanol were mixed to obtain a mixed solution I. The total amount of the mixed solution I, 5 parts by mass of a sulfur-containing pigment derivative (1-1), and methanol were mixed to obtain a mixed solution II. Methanol was distilled off under reduced pressure at 80° C. from the mixed solution II to obtain a residue. The residue was filtered with water and dried at 80° C. to obtain a dried product. The dried product was pulverized using a Counter Jet Mill (registered trademark) (manufactured by Hosokawa Micron Group) to obtain a pigment composition. In the obtained pigment composition, the derivative content ratio was 5 mass %.

(Preparation of Pigment Dispersion Resin)

A pigment dispersion resin (R-A) including a repeating unit derived from methacrylic acid (MAA unit), a repeating unit derived from methyl methacrylate (MMA unit), a repeating unit derived from butyl acrylate (BA unit), and a repeating unit derived from styrene (ST unit) was prepared. In this pigment dispersion resin (R-A), the mass average molecular weight (Mw) was 20000 and the acid value was 100 mgKOH/g. The mass ratio of each repeating unit in this pigment dispersion resin (R-A) was "MAA unit:MMA unit:BA unit:ST unit=8.2:30.0:30.0:31.8".

(Measurement of Acid Value of Pigment Dispersion Resin)

The acid value of the above-mentioned pigment dispersion resin (R-A) was measured in accordance with "JIS (Japanese Industrial Standard) K0070:1992".

(Measurement of Mass Average Molecular Weight of Pigment Dispersion Resin)

The mass average molecular weight of the above-mentioned pigment dispersion resin (R-A) was measured under the following measurement conditions using gel permeation chromatography ("HLC-8020GPC" manufactured by TOSOH CORPORATION). The calibration curves were created using F-40, F-20, F-4, F-1, A-5000, A-2500, and A-1000, which are TSKgel standard polystyrene manufactured by TOSOH CORPORATION, and n-propylbenzene.

The measurement conditions for the mass average molecular weight were as follows.

Column: "TSKgel SuperMultiporeHZ-H" (semi-micro-column of 4.6 mm I.D.×15 cm) manufactured by TOSOH CORPORATION
Number of columns: 3
Eluent: tetrahydrofuran
Flow rate: 0.35 mL/min
Sample injection amount: 10 μL
Measurement temperature: 40° C.
Detector: IR detector (Preparation of Pigment Dispersion Liquid)

A pigment dispersion liquid was prepared such that a composition d-a shown in Table 3 was obtained.

TABLE 3

| Pigment dispersion liquid | Composition d-a [parts by mass] |
|---|---|
| Water | Remaining amount |
| Pigment dispersion resin(R-A) | 6.0 |
| Sodium hydroxide | Predetermined amount |
| Pigment composition (see Table 5) | 15.0 |
| OLFINE E1010 | 0.5 |
| Total | 100.0 |

First, 6.0 parts by mass of the pigment dispersion resin (R-A) and an aqueous sodium hydroxide solution were mixed. The aqueous sodium hydroxide solution contained a predetermined amount of sodium hydroxide. The "predetermined amount" that is the amount of sodium hydroxide added shown in Table 3 indicates 1.05 times the amount necessary for neutralizing an equal amount of the pigment dispersion resin (R-A). In this way, the pigment dispersion resin (R-A) was neutralized with an equal amount (strictly speaking, 105% equal amount) of sodium hydroxide to obtain an aqueous solution III including the pigment dispersion resin (R-A).

The total amount of the obtained aqueous solution III, 15.0 parts by mass of the pigment composition obtained in the above-mentioned "preparation of pigment composition", 0.5 parts by mass of a nonionic surfactant ("OLFINE (registered trademark) E1010" manufactured by Nissin Chemical co., ltd., content: an ethylene oxide adduct of acetylenediol, active ingredient concentration: 100 mass %, HLB value: 13.5±0.5), and a remaining amount of water were added to a vessel. The content of the vessel was mixed using a media-type wet disperser ("DYNO (registered trademark)-MILL" manufactured by Willy A Bachofen AG (WAB)) to obtain a mixed solution IV.

Note that the "remaining amount" that is the amount of water added shown in Table 3 means the amount that makes the mixed solution IV 100.0 parts by mass. The remaining amount of water shown in Table 3 indicates the total amount of the above-mentioned water added to the vessel and water contained in the aqueous solution III (in detail, water contained in the aqueous sodium hydroxide solution used for neutralizing the pigment dispersion resin and water generated by the neutralization reaction between the pigment dispersion resin and sodium hydroxide).

Subsequently, the content of the above-mentioned vessel was dispersed using zirconia beads (particle diameter of 0.5 mm) as media and a bead mill ("nano grain mill" manufactured by ASADA IRON WORKS.CO.,LTD.). The dispersion conditions for the bead mill were a temperature of 10° C., a circumferential speed of 8 m/see, and an ejection rate of 300 g/min. In this way, a pigment dispersion liquid was obtained.

(Preparation of Ink)

An ink (I-1) was prepared such that a composition i-a shown in Table 4 was obtained.

TABLE 4

| Ink | Composition i-a [parts by mass] |
|---|---|
| Pigment dispersion liquid | 40.0 |
| SURFYNOL 420 | 0.3 |
| 3-methyl-1,5-pentanediol (LogP: 0.07) | 20.0 |
| Glycerin ( LogP: −1.76) | 5.0 |
| Water | Remaining amount |
| Total | 100.0 |

First, water was added to a flask equipped with a stirrer ("Three-One Motor (registered trademark) BL-600" manufactured by Shinto Scientific Co., Ltd.). While stirring the content of the flask at a stirring speed of 400 rpm using the stirrer, the pigment dispersion liquid obtained in the above-mentioned "preparation of pigment dispersion liquid", a nonionic surfactant ("SURFYNOL (registered trademark) 420" manufactured by Nissin Chemical co., ltd., content: an ethylene oxide adduct of acetylene glycol, active ingredient concentration: 100 mass %, HLB value: 4), 3-methyl-1,5-pentanediol and, glycerin were added thereto to obtain a mixed solution V. The amount of each raw material added was as shown in Table 4. The "remaining amount" that is the amount of water added shown in Table 4 means the amount that makes the mixed solution V 100.0 parts by mass. The mixed solution was filtered with a filter having a pore size of 5 μm to remove foreign substances and coarse particles from the mixed solution. In this way, the ink (I-1) was obtained.

<Preparation of Inks (I-2) to (I-5)>

Inks (I-2) to (I-5) were prepared in the same manner as in the preparation of the ink (I-1) except that the following points were changed. In the preparation of the pigment composition, the derivative content ratio was changed as shown in the following Table 5. In the preparation of the pigment dispersion liquid, the ejection rate of the dispersion conditions in the dispersion was changed as shown in the following Table 5.

<Measurement>

A measurement target (each of the inks (I-1) to (I-5)) was centrifuged by the following method. Then, the predetermined sulfur concentration and the unadsorbed resin ratio of each of the obtained supernatant liquids were measured. The measurement results are shown in the following Table 5.

(Predetermined Sulfur Concentration)

First, 2 g of the measurement target sealed in a container was centrifuged at the rotation speed of 140,000 rpm (corresponding to the centrifugal force of 1,050,000 G) for 3 hours under an environment of 23° C. using an ultracentrifuge ("himac (registered trademark) CS150FNX" manufactured by Eppendorf Himac Technologies Co., Ltd., a rotor: S140AT). This caused the pigment particles included in the measurement target to be precipitated.

1 mL of the supernatant liquid included in the measurement target after the centrifugal treatment was collected with a syringe. The collected supernatant liquid was diluted 10-fold with water and used as a measurement sample. The measurement sample was measured using an inductively coupled plasma (ICP) mass spectrometer ("iCAP PRO ICP-OES Duo" manufactured by Thermo Fisher Scientific Inc.). The sulfur concentration (unit: ppm) in the supernatant liquid was obtained on the basis of the obtained value.

(Unadsorbed Resin Ratio)

2 g of the measurement target was centrifuged in the same manner as in the centrifugal treatment in the measurement of the above-mentioned predetermined sulfur concentration.

The total amount of the supernatant liquid included in the measurement target after the centrifugal treatment was collected. Next, the total amount of the collected supernatant liquid was placed in a disposable cup, and the supernatant liquid was dried under a reduced pressure at 60° C. for 24 hours to obtain a residue. The mass (WA) of the residue was measured. The mass (WA) of the residue was regarded as the mass of the unadsorbed resin.

The mass (WD) of the pigment dispersion resin included in 2 g of the measurement target was calculated in accordance with the following formula on the basis of a content ratio B (=6.0 mass %) of the pigment dispersion resin (R-A) in the pigment dispersion liquid read from Table 3 and a content ratio C(=40.0 mass %) of the pigment dispersion liquid in the ink read from Table 4.

$$WD = 2 \times (C/100) \times (B/100)$$

Then, the unadsorbed resin ratio was calculated in accordance with the following formula on the basis of the mass (WA) of the residue obtained from 2 g of the measurement target and the mass (WD) of the pigment dispersion resin included in 2 g of the measurement target.

$$\text{Unadsorbed resin ratio [mass \%]} = 100 \times WA/WD$$

<Evaluation>

Each of the inks (I-1) to (I-5) was evaluated for the dispersibility of the quinacridone pigment and the presence or absence of misdirection of the ink from the recording head by the following method. The evaluation results are shown in the following Table 5.

tend to be generated due to aggregation of the pigment particles and the ink concentration tends to decrease.

(Criteria for Dispersibility of Quinacridone Pigment)

Good: $D_{50}$ of the pigment particles is less than 140 nm.

Poor: $D_{50}$ of the pigment particles is 140 nm or more.

(Misdirection of Ink from Recording Head)

The misdirection of the ink from the recording head was evaluated in an environment of a temperature of 25° C. and a humidity of 60% RH. As an evaluation device, an inkjet recording device (prototype manufactured by KYOCERA Document Solutions Inc.) was used. The evaluation device was equipped with a piezoelectric line head including a nozzle (pore size of an opening: 10 μm). An evaluation target (in detail, one of the inks (I-1) to (I-5)) was set in the magenta ink line head of the evaluation device. The temperature of the line head was set to 40° C. The ejection rate of the ink per pixel was set to 3.5 pL.

An image (20.5 mm×29.0 mm) with image processing settings for ejecting the ink from all nozzles of the line head was continuously printed on sheets of paper (plain paper "C2" manufactured by FUJIFILM Business Innovation Corp.) for one hour using the evaluation device. The image (initial image) printed at the beginning of the continuous printing and the image (print-durability image) printed at the end of the continuous printing were observed with the naked eye. Then, the presence or absence of white streaks in the initial image and the print-durability image was checked. The white streaks are image defects caused by misdirection of the ink from the recording head. The misdirection of the ink from the recording head was judged in accordance with the following criteria.

(Criteria for Misdirection)

Good (A): No more white streaks are generated in the print-durability image than in the initial image.

Poor (B): More white streaks are generated in the print-durability image than in the initial image.

TABLE 5

| | | Pigment composition | | | | | | | | |
|---|---|---|---|---|---|---|---|---|---|---|
| | | Pigment | | Derivative | | Unadsorbed | Dispersion | | | Pigment |
| | Ink | Type | Content ratio [mass %] | Type | Content ratio [mass %] | resin ratio (mass %] | ejection rate [g/min] | Sulfur concentration [ppm] | Misdirection | particle diameter [nm] |
| Example 1 | I-1 | PR122 | 95 | 1-1 | 5 | 20 | 300 | 1.8 | A | 120 |
| Example 2 | I-2 | PR122 | 95 | 1-1 | 5 | 24 | 335 | 1.7 | A | 120 |
| Example 3 | I-3 | PR122 | 97 | 1-1 | 3 | 25 | 350 | 0.5 | A | 135 |
| Comparative Example 1 | I-4 | PR122 | 94 | 1-1 | 6 | 22 | 310 | 2.3 | B | 122 |
| Comparative Example 2 | I-5 | PR122 | 97 | 1-1 | 3 | 22 | 315 | 0.3 | A | 140 (Poor) |

(Dispersibility of Quinacridone Pigment)

The dispersibility of the quinacridone pigment was evaluated by measuring $D_{50}$ of the pigment particles included in the ink. The ink was diluted 100-fold with water and used as a measurement sample. $D_{50}$ of the pigment particles in the measurement sample was measured using a dynamic light scattering particle size distribution analyzer ("Zetasizer Nano ZS" manufactured by Malvern Panalytical Ltd.). $D_{50}$ of the pigment particles in the measurement sample was used as $D_{50}$ of the pigment particles in the ink. The dispersibility of the quinacridone pigment was judged in accordance with the following criteria. Note that when $D_{50}$ of the pigment particles in the ink is 140 nm or more, sediments The terms in Table 5 and Table 6, Table 8, Table 10, Table 12, Table 13, and Table 14 described below have the following meanings. The "pigment" indicates a quinacridone pigment. "PR122" indicates C.I. Pigment Red 122. The "derivative" indicates a sulfur-containing pigment derivative. The "content ratio" in the column of the "derivative" indicates the derivative content ratio, i.e., the content ratio of the sulfur-containing pigment derivative with respect to the total mass of the quinacridone pigment and the sulfur-containing pigment derivative. The "content ratio" of the column of the "pigment" indicates the content ratio of the quinacridone pigment with respect to the total mass of the quinacridone pigment and the sulfur-containing pigment derivative. The "dispersion ejection rate" indicates the ejection rate of the dispersion conditions by the bead mill in the above-mentioned “preparation of pigment dispersion liquid”. The “sulfur concentration” indicates the predetermined sulfur concentration. The “misdirection” indicates the judgement result of the misdirection of the ink from the recording head. The “pigment particle diameter” indicates $D_{50}$ of the pigment particles measured in the evaluation of the dispersibility of the quinacridone pigment.

As shown in Table 5, the predetermined sulfur concentration of the ink (I-4) exceeded 2.0 ppm. In the case where the ink (I-4) was used, misdirection of the ink from the recording head occurred. The predetermined sulfur concentration of the ink (I-5) was less than 0.5 ppm. $D_{50}$ of the pigment particles in the ink (I-5) was 140 nm or more, and the ink (I-5) had poor dispersibility of the quinacridone pigment.

On the other hand, the predetermined sulfur concentration of each of the inks (I-1) to (I-3) was 0.5 ppm or more and 2.0 ppm or less. Each of the inks (I-1) to (I-3) had excellent dispersibility of the quinacridone pigment and was capable of suppressing misdirection of the ink from the recording head.

[Study 2: Unadsorbed Resin Ratio]

Subsequently, the unadsorbed resin ratio was studied. Inks (I-6) to (I-11) were prepared in the same manner as in the preparation of the ink (I-1) except that the following points were changed. The derivative content ratio in the above-mentioned “preparation of pigment composition” was changed as shown in Table 6. Specifically, instead of the wet cake of the quinacridone pigment with a solid content of 95 parts by mass and 5 parts by mass of the sulfur-containing pigment derivative (1-1), a wet cake of a quinacridone pigment with a solid content of 96 parts by mass and 4 parts by mass of the sulfur-containing pigment derivative (1-1) were added. Further, the ejection rate of the dispersion conditions by the bead mill in the above-mentioned “preparation of pigment dispersion liquid” was changed as shown in Table 6. By changing the ejection rate of the dispersion conditions, the unadsorbed resin ratio was changed.

For each of the inks (I-6) to (I-11), the predetermined sulfur concentration and the unadsorbed resin ratio were measured in the same manner as in the above-mentioned “Study 1”, and the dispersibility of the quinacridone pigment and the presence or absence of misdirection of the ink from the recording head were evaluated. The measurement results and the evaluation results are shown in Table 6.

TABLE 6

| | | Pigment composition | | | | | | | | |
|---|---|---|---|---|---|---|---|---|---|---|
| | | Pigment | | Derivative | | Unadsorbed | Dispersion | | | Pigment |
| | Ink | Type | Content ratio [mass %] | Type | Content ratio [mass %] | resin ratio [mass %] | ejection rate [g/min] | Sulfur concentration [ppm] | Misdirection | particle diameter [nm] |
| Example 4 | I-6 | PR122 | 96 | 1-1 | 4 | 15 | 200 | 1.3 | A | 126 |
| Example 5 | I-7 | PR122 | 96 | 1-1 | 4 | 20 | 300 | 1.3 | A | 128 |
| Example 5 | I-8 | PR122 | 96 | 1-1 | 4 | 35 | 400 | 1.3 | A | 130 |
| Example 7 | I-9 | PR122 | 96 | 1-1 | 4 | 40 | 500 | 1.3 | A | 125 |
| Comparative Example 3 | I-10 | PR122 | 96 | 1-1 | 4 | 43 | 600 | 1.3 | B | 127 |
| Example 8 | I-11 | PR122 | 96 | 1-1 | 4 | 5 | 70 | 1.2 | A | 118 |

As shown in Table 6, the unadsorbed resin ratio of the ink (I-10) exceeded 40 mass %. In the case where the ink (I-10) was used, misdirection of the ink from the recording head occurred.

On the other hand, the unadsorbed resin ratio of each of the inks (I-6) to (I-9) and (I-11) was 40 mass % or less. Each of the inks (I-6) to (I-9) and (I-11) had excellent dispersibility of the quinacridone pigment and was capable of suppressing misdirection of the ink from the recording head.

[Study 3: Log P of Water-Soluble Organic Solvent]

Subsequently, Log P of the water-soluble organic solvent was studied. Inks (I-12) to (I-17) were prepared in the same manner as in the preparation of the ink (I-1) except that the following points were changed. The composition i-a in the above-mentioned “preparation of ink” was changed to a composition i-b shown in Table 7. As a water-soluble organic solvent b shown in Table 7, a water-soluble organic solvent b shown in Table 8 was used. For reference, the Log P of the water-soluble organic solvent b is also shown in Table 8.

For each of the inks (I-12) to (I-17), the predetermined sulfur concentration and the unadsorbed resin ratio were measured in the same manner as in the above-mentioned “Study 1”, and the dispersibility of the quinacridone pigment and the presence or absence of misdirection of the ink from the recording head were evaluated. The measurement results and the evaluation results are shown in Table 8.

TABLE 7

| Ink | Composition i-b [parts by mass] |
|---|---|
| Pigment dispersion liquid | 40.0 |
| SURFYNOL 420 | 0.3 |
| Water-soluble organic solvent b (see Table 8) | 20.0 |
| Glycerin (LogP: −1.76) | 5.0 |
| Water | Remaining amount |
| Total | 100.0 |

TABLE 8

| | Ink | Water-soluble organic solvent b | LogP | Unadsorbed resin ratio [mass %] | Sulfur concentration [ppm] | Misdirection | Pigment particle diameter [nm] |
|---|---|---|---|---|---|---|---|
| Example 9 | I-12 | Triethylene glycol monobutylether | 0.02 | 20 | 1.8 | A | 125 |
| Example 10 | I-13 | 3-methyl-1,5-pentanediol | 0.07 | 20 | 1.8 | A | 127 |
| Example 11 | I-14 | 1,2-pentanediol | 0.00 | 20 | 1.8 | A | 127 |
| Comparative Example 4 | I-15 | Diethylene glycol monoethylether | −0.54 | 20 | 1.8 | B | 128 |
| Comparative Example 5 | I-16 | 1,6-hexanediol | −0.11 | 20 | 1.8 | B | 125 |
| Example 12 | I-17 | Diethylene glycol monobutylether | 0.30 | 20 | 1.8 | A | 128 |

As shown in Table 8, the Log P of the water-soluble organic solvent included in each of the inks (I-15) and (I-16) was less than 0.00 and no predetermined water-soluble organic solvent was included. In the case where each of the inks (I-15) and (I-16) was used, misdirection of the ink from the recording head occurred.

On the other hand, each of the inks (I-12) to (I-14) and (I-17) included a predetermined water-soluble organic solvent having Log P of 0.00 or more. Each of the inks (I-12) to (I-14) and (I-17) had excellent dispersibility of the quinacridone pigment and was capable of suppressing misdirection of the ink from the recording head.

[Study 4: Content Ratio of Predetermined Water-Soluble Organic Solvent]

Subsequently, the content ratio of the predetermined water-soluble organic solvent was studied. Inks (I-18) to (I-23) were prepared in the same manner as in the preparation of the ink (I-1) except that the following points were changed. The composition i-a in the above-mentioned “preparation of ink” was changed to a composition i-c shown in Table 9. The amount of triethylene glycol monobutylether added shown in Table 9 was set to the amount that would obtain the content ratio of the predetermined water-soluble organic solvent shown in Table 10.

TABLE 9

| Ink | Composition i-c [parts by mass] |
|---|---|
| Pigment dispersion liquid | 40.0 |
| SURFYNOL 420 | 0.3 |
| Triethylene glycol monobutylether (LogP: 0.02) | See FIG. 10 |
| Glycerin (LogP: −1.76) | 5.0 |
| Water | Remaining amount |
| Total | 100.0 |

TABLE 10

| | Ink | Predetermined water-soluble organic solvent content ratio [mass %] | Unadsorbed resin ratio [mass %] | Sulfur concentration [ppm] | Misdirection | Pigment particle diameter [nm] |
|---|---|---|---|---|---|---|
| Comparative Example 6 | I-18 | 13 | 20 | 1.8 | B | 120 |
| Example 13 | I-19 | 15 | 20 | 1.8 | A | 127 |
| Example 14 | I-20 | 25 | 20 | 1.8 | A | 127 |
| Example 15 | I-21 | 35 | 20 | 1.8 | A | 128 |
| Example 16 | I-22 | 40 | 20 | 1.8 | A | 135 |
| Comparative Example 7 | I-23 | 43 | 20 | 1.8 | B | 143 (Poor) |

For each of the inks (I-18) to (I-23), the predetermined sulfur concentration and the unadsorbed resin ratio were measured in the same manner as in the above-mentioned “Study 1”, and the dispersibility of the quinacridone pigment and the presence or absence of misdirection of the ink from the recording head were evaluated. The measurement results and the evaluation results are shown in Table 10. In Table 10, the “predetermined water-soluble organic solvent content ratio” indicates the content ratio of the predetermined water-soluble organic solvent with respect to the mass of the ink.

As shown in Table 10, the content ratio of the predetermined water-soluble organic solvent in the ink (I-18) was less than 15 mass %. In the case where the ink (I-18) was used, misdirection of the ink from the recording head occurred. The content ratio of the predetermined water-soluble organic solvent in the ink (I-23) exceeded 40 mass %. $D_{50}$ of the pigment particles in the ink (I-23) was 140 nm or more, aggregation of the pigment particles occurred, and the dispersibility of the quinacridone pigment was poor. Further, in the case where the ink (I-23) was used, misdirection of the ink from the recording head occurred. The reason for this is presumably because $D_{50}$ of the pigment particles was excessively large, causing the flight path of the ink (I-23) ejected from the recording head to deviate.

On the other hand, the content ratio of the predetermined water-soluble organic solvent in each of the inks (I-19) to (I-22) was 15 mass % or more and 40 mass % or less. Each of the inks (I-19) to (I-22) had excellent dispersibility of the quinacridone pigment and was capable of suppressing misdirection of the ink from the recording head.

[Study 5: Log P and Content Ratio of Predetermined Water-Soluble Organic Solvent]

Subsequently, the Log P and content ratio of the predetermined water-soluble organic solvent were studied. That is, a case where a predetermined water-soluble organic solvent having Log P different from the Log P of the predetermined water-soluble organic solvent in the ink (I-1) was used at a content ratio different from the content ratio of the predetermined water-soluble organic solvent in the ink (I-1) was studied. An ink (I-24) was prepared in the same manner as in the preparation of the ink (I-1) except that the composition i-a in the above-mentioned "preparation of ink" was changed to a composition i-d shown in Table 11.

For the ink (I-24), the predetermined sulfur concentration and the unadsorbed resin ratio were measured in the same manner as in the above-mentioned "Study 1", and the dispersibility of the quinacridone pigment and the presence or absence of misdirection of the ink from the recording head were evaluated. The measurement results and the evaluation results are shown in Table 12. For reference, the content ratio of the predetermined water-soluble organic solvent (1,2-pentanediol) is also shown in Table 12. In Table 12, The "predetermined water-soluble organic solvent content ratio" indicates the content ratio of the predetermined water-soluble organic solvent with respect to the mass of the ink.

TABLE 11

| Ink | Composition i-d [parts by mass] |
|---|---|
| Pigment dispersion liquid | 40.0 |
| SURFYNOL 420 | 0.3 |
| 1,2-pentanediol (LogP: 0.00) | 25.0 |
| Glycerin (LogP: −1.76) | 5.0 |
| Water | Remaining amount |
| Total | 100.0 |

TABLE 12

| | Ink | Predetermined water-soluble organic solvent content ratio [mass %] | Unadsorbed resin ratio [mass %] | Sulfur concentration [ppm] | Misdirection | Pigment particle diameter [nm] |
|---|---|---|---|---|---|---|
| Example 17 | I-24 | 25 | 20 | 1.8 | A | 126 |

The Log P and content ratio of the predetermined water-soluble organic solvent in the ink (I-24) were different from the Log P and content ratio of the predetermined water-soluble organic solvent in the ink (I-1). However, as shown in Table 12, the ink (I-24) included a predetermined water-soluble organic solvent having Log P of 0.00 or more, and the content ratio of the predetermined water-soluble organic solvent with respect to the mass of the ink was 15 mass % or more and 40 mass % or less. For this reason, the ink (I-24) had excellent dispersibility of the quinacridone pigment and was capable of suppressing misdirection of the ink from the recording head.

[Study 6: Sulfur-Containing Pigment Derivative]

Subsequently, the sulfur-containing pigment derivative was studied. That is, a case where a sulfur-containing pigment derivative different from the sulfur-containing pigment derivative in the ink (I-1) was used was studied. An ink (I-25) was prepared in the same manner as in the preparation of the ink (I-1) except that the following points were changed. The type and content ratio of sulfur-containing pigment derivative in the above-mentioned "preparation of pigment composition" were changed as shown in Table 13. Specifically, instead of the wet cake of the quinacridone pigment with a solid content of 95 parts by mass and 5 parts by mass of the sulfur-containing pigment derivative (1-1), a wet cake of a quinacridone pigment with a solid content of 96 parts by mass and 4 parts by mass of a sulfur-containing pigment derivative (1-2) were added. Further, the ejection rate of the dispersion conditions by the bead mill in the above-mentioned "preparation of pigment dispersion liquid" was changed as shown in Table 13.

For the ink (I-25), the predetermined sulfur concentration and the unadsorbed resin ratio were measured in the same manner as in the above-mentioned "Study 1", and the dispersibility of the quinacridone pigment and the presence or absence of misdirection of the ink from the recording head were evaluated. The measurement results and the evaluation results are shown in Table 13.

TABLE 13

| | | Pigment composition | | | | | | | | |
|---|---|---|---|---|---|---|---|---|---|---|
| | | Pigment | | Derivative | | Unadsorbed | Dispersion | | | Pigment |
| | Ink | Type | Content ratio [mass %] | Type | Content ratio [mass %] | resin ratio [mass %] | ejection rate [g/min] | Sulfur concentration [ppm] | Misdirection | particle diameter [nm] |
| Example 18 | I-25 | PR122 | 96 | 1-2 | 4 | 17 | 200 | 1.1 | A | 121 |

The sulfur-containing pigment derivative (1-2) included in the ink (I-25) was different from the sulfur-containing pigment derivative (1-1) included in the ink (I-1). However, as shown in Table 13, the predetermined sulfur concentration of the ink (I-25) was 0.5 ppm or more and 2.0 ppm or less. For this reason, as shown in Table 13, the ink (I-25) had excellent dispersibility of the quinacridone pigment and was capable of suppressing misdirection of the ink from the recording head.

[Study 7: Quinacridone Pigment]

Subsequently, the quinacridone pigment was studied. That is, a case where a quinacridone pigment different from the quinacridone pigment in the ink (I-1) was used was studied. An ink (I-26) was prepared in the same manner as in the preparation of the ink (I-1) except that the following points were changed. Instead of the wet cake of the quinacridone pigment (C.I. Pigment Red 122) with a solid content of 95 parts by mass in the above-mentioned "preparation of pigment composition", a wet cake of a quinacridone pigment (C.I. Pigment Violet 19) with a solid content of 95 parts by mass was added.

For the ink (I-26), the predetermined sulfur concentration and the unadsorbed resin ratio were measured in the same manner as in the above-mentioned "Study 1", and the dispersibility of the quinacridone pigment and the presence or absence of misdirection of the ink from the recording head were evaluated. The measurement results and the evaluation results are shown in Table 14. In Table 14, "PV19" indicates C.I. Pigment Violet 19.

TABLE 14

| | | Pigment composition | | | | | | | | |
|---|---|---|---|---|---|---|---|---|---|---|
| | | Pigment | | Derivative | | Unadsorbed | Dispersion | | | Pigment |
| | Ink | Type | Content ratio [mass %] | Type | Content ratio [mass %] | resin ratio [mass %] | ejection rate [g/min] | Sulfur concentration [ppm] | Misdirection | particle diameter [nm] |
| Example 19 | I-26 | PV19 | 95 | 1-1 | 5 | 20 | 300 | 1.6 | A | 123 |

The C.I. Pigment Violet 19 included in the ink (I-26) was different from the C.I. Pigment Red 122 included in the ink (I-1). However, the C.I. Pigment Violet 19 was also a type of quinacridone pigment, similarly to C.I. Pigment Red 122. For this reason, as shown in FIG. 14, the ink (I-26) had excellent dispersibility of the quinacridone pigment and was capable of suppressing misdirection of the ink from the recording head.

INDUSTRIAL APPLICABILITY

The ink and inkjet recording device according to the present invention can be used for forming images.

What is claimed is:

1. An inkjet ink, comprising:

a quinacridone pigment;

a pigment dispersion resin; and a water-soluble organic solvent, the pigment dispersion resin including an adsorbed resin adsorbed on the quinacridone pigment and an unadsorbed resin that is not adsorbed on the quinacridone pigment, a ratio of the unadsorbed resin to the pigment dispersion resin being 40 mass % or less, the water-soluble organic solvent including a predetermined water-soluble organic solvent having an octanol/water partition coefficient Log P of 0.00 or more, a content ratio of the predetermined water-soluble organic solvent with respect to a mass of the inkjet ink being 15 mass % or more and 40 mass % or less, a sulfur concentration in a supernatant liquid obtained by centrifuging the inkjet ink at 1,050,000 G for 3 hours being 0.5 ppm or more and 2.0 ppm or less.

2. The inkjet ink according to claim 1, further comprising a sulfur compound represented by the formula (1):

(1)

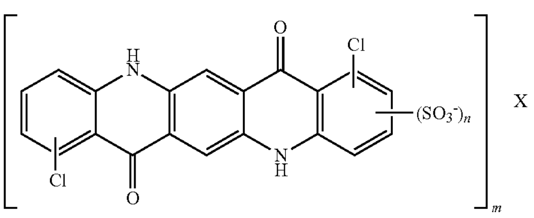

wherein, in the formula (1), n represents an integer of 1 or more and 3 or less, m represents an integer of 1 or more and 3 or less, and X represents a metal ion.

3. The inkjet ink according to claim 2, wherein
X in the formula (1) represents $Al^{3+}$ or $Mg^{2+}$.

4. The inkjet ink according to claim 2, wherein
a content ratio of the sulfur compound represented by the formula (1) with respect to a total mass of the quinacridone pigment and the sulfur compound represented by the formula (1) is 3 mass % or more and 5 mass % or less.

5. The inkjet ink according to claim 1, wherein
the predetermined water-soluble organic solvent is 3-methyl-1,5-pentanediol, triethylene glycol monobutylether, 1,2-pentanediol, or diethylene glycol monobutylether.

6. An inkjet recording device, comprising:
the inkjet ink according to claim 1;
a conveying unit that conveys a recording medium; and
a line head,
the line head ejecting the inkjet ink to the recording medium.

* * * * *